(12) United States Patent
Campbell, III (10) Patent No.: US 11,640,232 B2
(45) Date of Patent: May 2, 2023

(54) COST EFFICIENT METHOD FOR COMMUNICATING FROM AN APPLIANCE TO AN EXTERNAL DEVICE

(71) Applicant: Electrolux Home Products, Inc., Charlotte, NC (US)

(72) Inventor: John Thomas Campbell, III, Pendleton, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 17/464,973

(22) Filed: Sep. 2, 2021

(65) Prior Publication Data

US 2023/0068447 A1 Mar. 2, 2023

(51) Int. Cl.
*H04L 67/12* (2022.01)
*G08B 5/36* (2006.01)
*G06F 3/0484* (2022.01)

(52) U.S. Cl.
CPC ............ *G06F 3/0484* (2013.01); *H04L 67/12* (2013.01); *G08B 5/36* (2013.01)

(58) Field of Classification Search
CPC .......... G06F 3/0484; H04L 67/12; G08B 5/36
See application file for complete search history.

(56) References Cited

U.S. PATENT DOCUMENTS

| | | |
|---|---|---|
| 5,155,614 A | 10/1992 | Carmen et al. |
| 5,349,162 A | 9/1994 | Holling |
| 5,841,112 A | 11/1998 | Brooks et al. |
| 6,208,838 B1 | 3/2001 | Isomichi |
| 6,230,214 B1 | 5/2001 | Liukkonen et al. |
| 9,054,953 B2 | 6/2015 | Lee et al. |
| 9,383,746 B2 | 7/2016 | Chang et al. |

(Continued)

FOREIGN PATENT DOCUMENTS

| | | |
|---|---|---|
| CN | 111181642 | 5/2020 |
| DE | 4225514 | 2/1994 |

(Continued)

OTHER PUBLICATIONS

Claytoncarney, "WRT348FMES00 Can't Enter Service Diagnostics Mode", Published on: Aug. 8, 2018, https://www.applianceblog.com/mainforums/threads/wrt348fmes00-cant-enter-service-diagnostics-mode.67048/, 1 page. (Year: 2018).*

(Continued)

*Primary Examiner* — Jennifer N Welch
*Assistant Examiner* — Kuang F Chen
(74) *Attorney, Agent, or Firm* — Pearne & Gordon LLP (57) ABSTRACT

Provided is a household appliance including a user interface with a visible indicator that conveys primary operational information indicative of an operational aspect of the household appliance to a user during normal operation of the household appliance, and a controller. The controller receives a signal indicative of diagnostics data of the household appliance and causes the visible indicator to transmit a communication signal to an external device that interprets the communication signal and communicates the diagnostics data to the user. The visible indicator provides a two-way communication between the household appliance and the external device. A method for diagnosing a household appliance is also provided.

17 Claims, 4 Drawing Sheets

(56) References Cited

U.S. PATENT DOCUMENTS

| | | |
|---|---|---|
| 10,250,327 B2 | 4/2019 | Cheon et al. |
| 2004/0051625 A1 | 3/2004 | Nass et al. |
| 2010/0040213 A1 | 2/2010 | Park et al. |
| 2011/0063510 A1 | 3/2011 | Lee |
| 2011/0178618 A1 | 7/2011 | Iggulden et al. |
| 2012/0303323 A1 | 11/2012 | Ha et al. |
| 2013/0223279 A1 | 8/2013 | Tinnakomsrisuphap et al. |
| 2013/0314226 A1 | 11/2013 | Zhang |
| 2014/0186048 A1 | 7/2014 | Oshima et al. |
| 2016/0099774 A1* | 4/2016 | Sim ................. H04W 88/06 398/115 |
| 2016/0123600 A1 | 5/2016 | Phillips et al. |
| 2016/0164606 A1* | 6/2016 | Liu ................... H04B 10/60 398/118 |
| 2016/0306622 A1* | 10/2016 | Kim ................... G06F 8/654 |

FOREIGN PATENT DOCUMENTS

| | | |
|---|---|---|
| EP | 1526418 A2 | 4/2005 |
| EP | 2530551 | 12/2012 |
| JP | 2003214631 A | 7/2003 |
| JP | 2004357895 A | 12/2004 |
| KR | 20190136358 | 12/2019 |
| WO | 2010117242 | 10/2010 |

OTHER PUBLICATIONS

International Search Report & Written Opinion issued for PCT/US2015/058186 dated Jan. 21, 2016, 16 pages.

Wtshymanski: LED circuit—wikipedia, Aug. 13, 2022. en.wikipedia.org/w/index.php?title=LED_circuit&oldid=1104152277. Retrieved on Feb. 2, 2023, 8 pages.

* cited by examiner

COST EFFICIENT METHOD FOR COMMUNICATING FROM AN APPLIANCE TO AN EXTERNAL DEVICE

CROSS-REFERENCE TO RELATED APPLICATIONS

Not applicable.

FIELD OF INVENTION

This application relates generally to a diagnostics method and a diagnostics system for a household appliance, and, more specifically, to a household appliance that can utilize existing visible indicators that serve another purpose during proper operation of the household appliance to also convey diagnostics information.

BACKGROUND OF INVENTION

Conventional household appliances, such as refrigerators, cooking appliances, washing appliances, etc., usually require a computer, specialized equipment, and software to physically connect to the control board of the appliance to monitor the appliance operation and diagnose issues. Except for some higher-end appliances, most household appliances typically lack sophisticated digital displays that can convey much information to the users. When operation is abnormal, some appliances may display a short (2-3 symbol) error code that is associated with a possible issue. However, this error code is often not intuitive, and the consumer needs to match the displayed error code with a potential issue listed in the user manual. Therefore, it is desirable to provide an improved diagnostics system that provides better diagnostic feedback to the user, without substantial increase of the cost of the appliance.

BRIEF SUMMARY OF THE INVENTION

In accordance with one aspect, there is provided a household appliance including a user interface with a visible indicator configured to convey primary operational information indicative of an operational aspect of the household appliance to a user during normal operation of the household appliance; and a controller configured to receive a signal indicative of diagnostics data of the household appliance and cause the visible indicator to transmit a communication signal to an external device that interprets the communication signal and communicates the diagnostics data to the user. The visible indicator is configured for a two-way communication between the household appliance and the external device.

In the refrigeration appliance according to the foregoing aspect, the visible indicator is configured as an input for receiving control signals from the external device.

In the refrigeration appliance according to the foregoing aspect, the control signals are used for controlling the household appliance, reprogramming, or recalibration.

In the refrigeration appliance according to the foregoing aspect, the communication signal is an error signal and the external device interprets the error signal and communicates the diagnostics data to the user.

In the refrigeration appliance according to the foregoing aspect, the visible indicator is configured for a Visible light communication (VLC) or an optical wireless communication (OWC).

In the refrigeration appliance according to the foregoing aspect, the external device is a portable device having a camera configured to interpret the communication signal.

In the refrigeration appliance according to the foregoing aspect, the external device communicates the diagnostics data to the user via an application installed on the portable device.

In the refrigeration appliance according to the foregoing aspect, one of a door switch, a knob, or a button actuation sequence on the household appliance is configured to start the two-way communication.

In the refrigeration appliance according to the foregoing aspect, a button sequence on the application is configured to start the two-way communication.

In the refrigeration appliance according to the foregoing aspect, the household appliance is one of a refrigerator, a freezer, a cooking appliance, a microwave oven, an air fryer, a coffee maker, a dishwasher, a washing machine, a laundry center, or a dryer.

In the refrigeration appliance according to the foregoing aspect, the communication signal comprises repeated illumination and deactivation of the visible indicator at a predetermined frequency or illumination sequence.

In the refrigeration appliance according to the foregoing aspect, the visible indicator is a discrete light emitting diode.

In the refrigeration appliance according to the foregoing aspect, the user interface comprises a plurality of visible indicators configured to convey different primary operational information during the normal operation of the household appliance, and at least one visible indicators of the plurality of visible indicators is controllable by the controller to display respective different subsets of the communication signal.

In accordance with another aspect, there is provided a method for diagnosing a household appliance with a user interface including a visible indicator and a controller. The method includes the steps of conveying, by the visible indicator, primary operational information indicative of an operational aspect of the household appliance to a user during normal operation of the household appliance; receiving, by the controller, a signal indicative of an error condition during operation of the household appliance; determining, by the controller, an error code corresponding to the error condition; causing, by the controller, the visible indicator to transmit the error code to an external device; interpreting the error code, by the external device; and communicating to the user diagnostics data corresponding to the error code. The visible indicator is configured for a two-way communication between the household appliance and the external device.

In the method for controlling a refrigeration appliance according to the foregoing aspect, the visible indicator is configured as an input for receiving control signals from the external device.

The method for controlling a refrigeration appliance according to the foregoing aspect further includes a step of transmitting the control signals from the external device to the household appliance for controlling the household appliance, reprogramming, or recalibration.

In the method for controlling a refrigeration appliance according to the foregoing aspect, the visible indicator is configured for a Visible light communication (VLC) or an optical wireless communication (OWC).

The method for controlling a refrigeration appliance according to the foregoing aspect further includes a step of waiting to detect one of a pre-determined button sequence to be inputted into one or more buttons of the appliance or a door switch actuation sequence on the household appliance before starting said two-way communication.

The method for controlling a refrigeration appliance according to the foregoing aspect further includes a step of waiting to detect a pre-determined button sequence to be inputted into an application downloaded to the external device before starting the two-way communication.

Other features and aspects may be apparent from the following detailed description, the drawings, and the claims.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation.

A household appliance includes a visual indicator that, during normal operation, visibly conveys information related to the operational state of the appliance. A controller operates the visual indicator to convey the information related to the operational state of the appliance or to convey error information identifying an error involving the operational state of the appliance. Example domestic appliances having the ability to visually communicate diagnostic information include household cooking appliances, such as refrigerators and freezers, cooking ranges and microwave ovens, dishwashers, washing machines, dryers, and other appliances commonly found in homes. However, for the sake of brevity, the visual communication of diagnostic information will be described below in the context of a refrigeration appliance. Further, the visual communication related to error information or code described below is merely for illustration purposes. Other information, such as various temperatures or appliance states, such as defrost, cooling, ice maker off, etc., for a refrigeration appliance, for example, may be communicated by the visual indicator.

Figure 1:
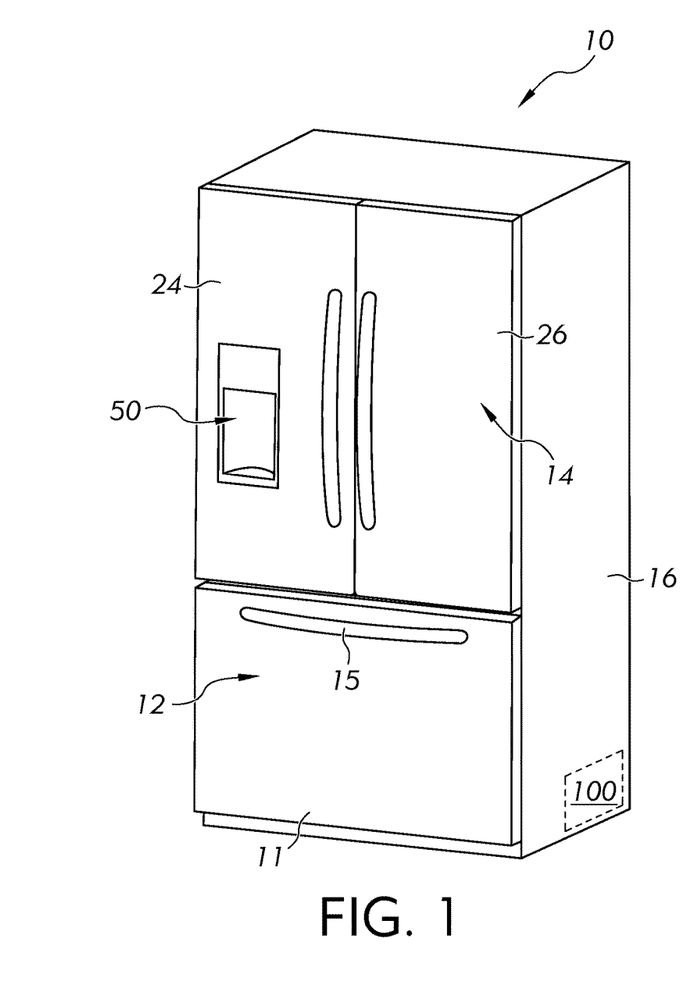
FIG. 1 is a front view of a household refrigeration appliance showing a bottom-mount freezer compartment below a fresh food compartment, wherein a dispensing station is disposed in one French-style door.

Referring now to the drawings, FIG. 1 shows a refrigeration appliance in the form of a domestic refrigerator, indicated generally at 10. Although the detailed description that follows concerns a domestic refrigerator 10 and refers to a "household" appliance, it is to be understood that the invention can be embodied by refrigeration appliances other than with a domestic refrigerator 10, or any other appliances commonly found in homes or commercial establishments, such as cooking ranges and microwave ovens, dishwashers, clothes washing machines and/or dryers, as well as any other appliance which can be used in a typical home setting. Further, an embodiment is described in detail below, and shown in the figures as a bottom-mount configuration of a refrigerator 10, including a fresh food compartment 14 disposed vertically above a freezer compartment 12. However, the refrigerator 10 can have any desired configuration including at least a fresh food compartment 14 and an ice maker 18 (FIG. 2), such as a top mount refrigerator (freezer disposed above the fresh food compartment), a side-by-side refrigerator (fresh food compartment is laterally next to the freezer compartment), a standalone refrigerator or freezer, etc.

One or more doors 24, 26 shown in FIG. 1 are pivotally coupled to a cabinet 16 of the refrigerator 10 to restrict and grant access to the fresh food compartment 14. The refrigerator 10 can include a single door that spans the entire lateral distance across the entrance to the fresh food compartment 14, or can include a pair of French-style doors 24, 26 as shown in FIG. 1 that collectively span the entire lateral distance of the entrance to the fresh food compartment 14 to enclose the fresh food compartment 14. For the latter configuration, a center flip mullion 13 (FIG. 2) is pivotally coupled to at least one of the doors 26 to establish a surface against which a seal provided to the other one of the doors 24 can seal the entrance to the fresh food compartment 14 at a location between opposing side surfaces (FIG. 2) of the doors 24, 26. The center mullion 13 can be pivotally coupled to the door 26 to pivot between a first orientation that is substantially parallel to a planar surface of the door 26 when the door 26 is closed, and a different orientation when the door 26 is opened. The externally-exposed surface of the center mullion 13 is substantially parallel to the door 26 when the center mullion 13 is in the first orientation, and forms an angle other than parallel relative to the door 26 when the center mullion 13 is in the second orientation. The seal and the externally-exposed surface of the center mullion 13 cooperate approximately midway between the lateral sides of the fresh food compartment 14.

A dispensing assembly 50 (FIG. 1) for dispensing at least ice pieces, and optionally water, can be provided on an exterior of one of the doors 24 that restricts access to the fresh food compartment 14. The dispensing assembly 50 includes at least one lever, switch, proximity sensor or other device that a user can interact with to cause frozen ice pieces to be dispensed from the ice maker 18 disposed within the fresh food compartment 14. Ice pieces from the ice maker 18 can exit the ice maker 18 through the outlet 18a and be delivered to the dispensing assembly 50 via an ice chute 22 (FIG. 2), which extends at least partially through the door 24 between the dispensing assembly 50 and the ice maker 18. The dispensing assembly 50 may also include at least one lever, switch, proximity sensor or other device that the user can interact with to cause water to be dispensed from source of water.

Referring back to FIG. 1, the freezer compartment 12 is arranged vertically beneath the fresh food compartment 14. A drawer assembly (not shown) including one or more freezer baskets (not shown) can be withdrawn from the freezer compartment 12 to grant a user access to food items stored in the freezer compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer compartment 12.

The freezer compartment 12 is used to freeze and/or maintain articles of food stored in the freezer compartment 12 in a frozen condition. For this purpose, the freezer compartment 12 is in thermal communication with a freezer evaporator (not shown) that removes thermal energy from the freezer compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 19 (FIG. 2) that defines the fresh food compartment 14. The fresh food compartment 14 is located in the upper portion of the refrigerator 10 in this example and serves to minimize spoiling of articles of food stored therein. The fresh food compartment 14 accomplishes this by maintaining the temperature in the fresh food compartment 14 at a cool temperature that is typically above 0° C., so as not to freeze the articles of food in the fresh food compartment 14. It is contemplated that the cool temperature preferably is between 0° C. and 10° C., more preferably between 0° C. and 5° C. and even more preferably between 0.25° C. and 4.5° C. According to some embodiments, cool air from which thermal energy has been removed by the freezer evaporator can also be blown into the fresh food compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food compartment 14 independent of the freezer compartment 12. According to an embodiment, the temperature in the fresh food compartment 14 can be maintained at a cool temperature within a close tolerance of a range between 0° C. and 4.5° C., including any subranges and any individual temperatures falling with that range. For example, other embodiments can optionally maintain the cool temperature within the fresh food compartment 14 within a reasonably close tolerance of a temperature between 0.25° C. and 4° C.

In the embodiment shown, French-style doors 24, 26 are pivotally coupled to a cabinet 16 of the refrigerator 10 to restrict and grant access to the fresh food compartment 14 and the dispensing assembly 50 is positioned on a door front. It is contemplated that the dispensing assembly 50 may be positioned on a door side or edge or inside the cabinet 16.

Figure 2:
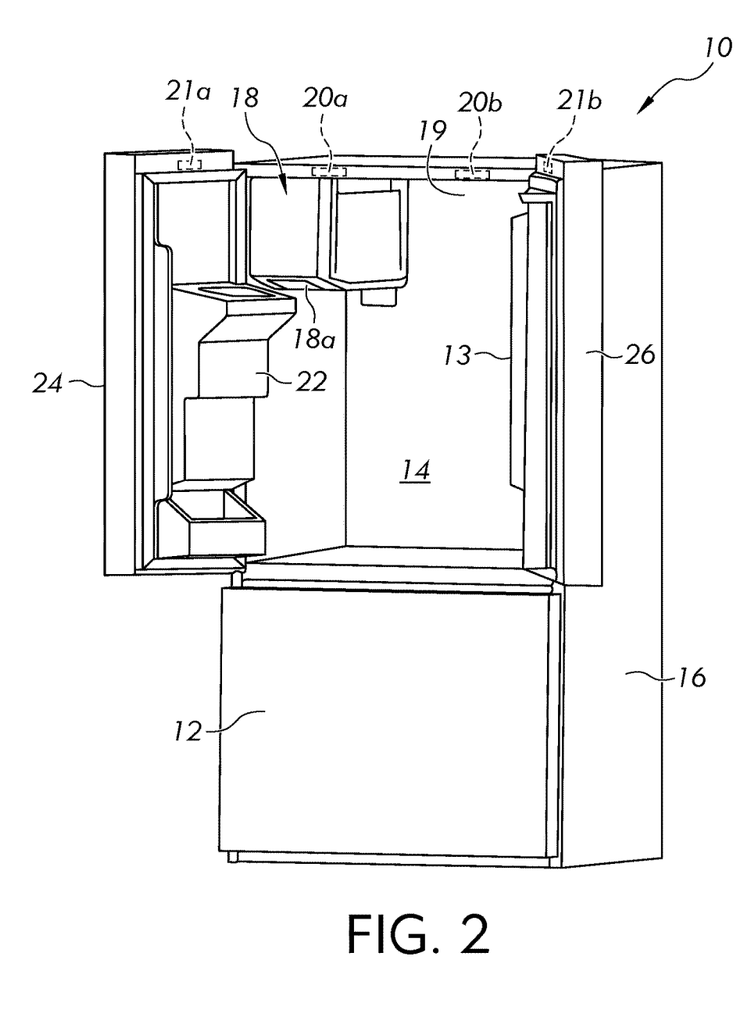
FIG. 2 is a front view of the refrigeration appliance of FIG. 1 showing the French-style doors of the fresh food compartment in an open position.

Referring to FIG. 2, when the doors 24, 26 are in an open position, access is granted to the ice maker 18 disposed in the fresh food compartment 14. The ice maker 18 includes an outlet 18a for supplying ice cubes to the ice chute 22 connected to a dispensing assembly (FIG. 1) in the door 24.

Figure 3:
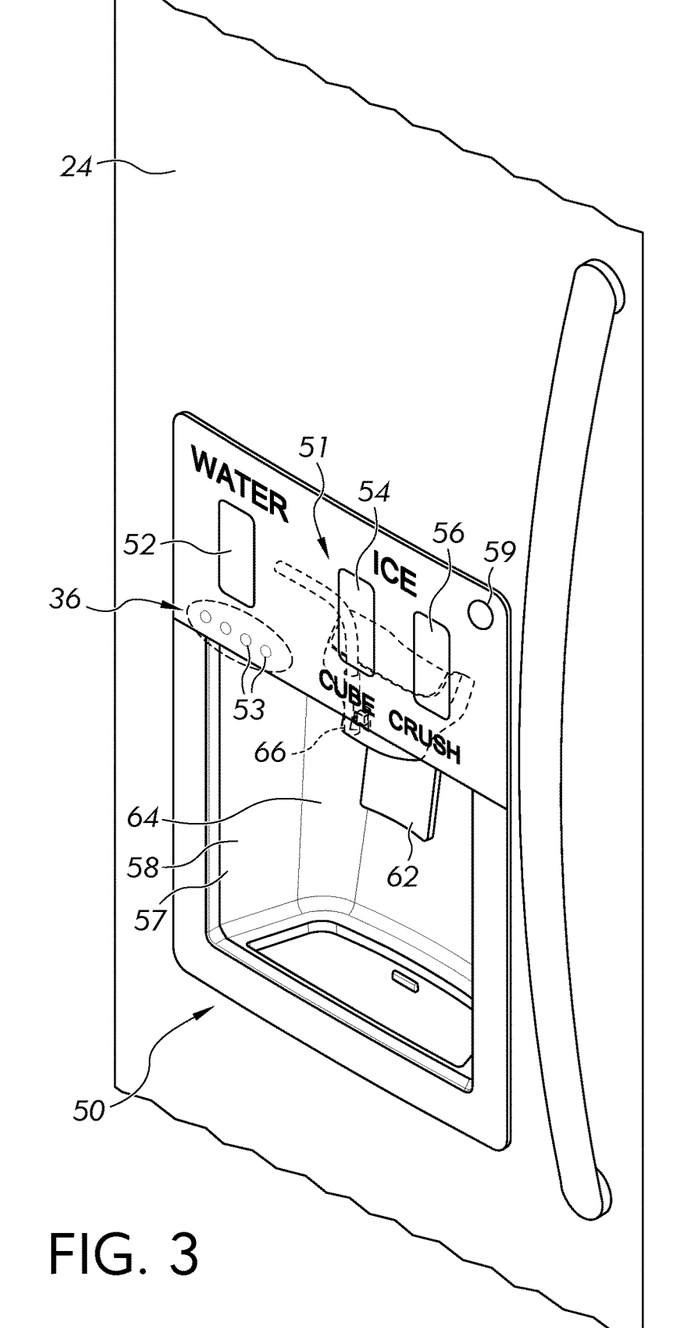
FIG. 3 is an enlarged perspective view of the dispensing station of FIG. 1.

Referring to FIG. 3, the dispensing assembly 50 includes a housing 57 that defines a recess or cavity 58 of the dispensing assembly 50. The recess or cavity 58 is configured and dimensioned to receive a container (not shown in FIG. 3), e.g., a bottle, a cup, a carafe, etc. An actuator or lever 62 is positioned on a rear wall of the housing 57. The actuator 62 is configured such that when the container is pressed against the actuator 62 the product selected by the user using the buttons 52, 54, 56 is delivered to the container. In particular, a chute 64 and a dispensing tube 66 are positioned in front of the actuator 62 such that when the actuator 62 is pressed the selected object will be dispensed, i.e., water, ice cubes or crushed from the chute 64 or from the dispensing tube 66.

The dispensing assembly 50 also includes a plurality of buttons 52, 54, 56 arranged on a user interface 51. The buttons 52, 54, 56 allow a user to select to dispensing water, ice cubes and crushed ice, respectively from the dispensing assembly 50. The first button 52 is a water selection button, the second button 54 is an ice cube selection button and the third button 56 is a crushed ice selection button.

A sensor 59 may be positioned on the user interface 51. The sensor 59 may be configured for detecting the presence of a user at a predetermined distance from a front surface of the user interface 51. It is contemplated that the predetermined distance may be variable or fixed, e.g., 0.5 m, 1.0 m, etc. The sensor 59 may be configured to send a signal to a controller 100 (described below) after detecting the presence of the user at the predetermined distance for a predetermined period of time. It is contemplated that the predetermined period of time may be variable or fixed, e.g., 3 secs, 5 secs, etc. It is contemplated that the sensor 59 may be an optical sensor, a capacitive sensor, an infrared (IR) sensor, a photocell, etc.

The illustrative embodiment of the dispensing assembly 50 in FIG. 3 includes a user interface 51 with limited display space that can illuminate an active button (e.g. WATER, ICE), the sensor 59, or provide other limited information. However, the user interface 51 is typically not operable to display alphabetical, numerical, alphanumerical, graphical, or other types of user-readable characters.

Figure 4:
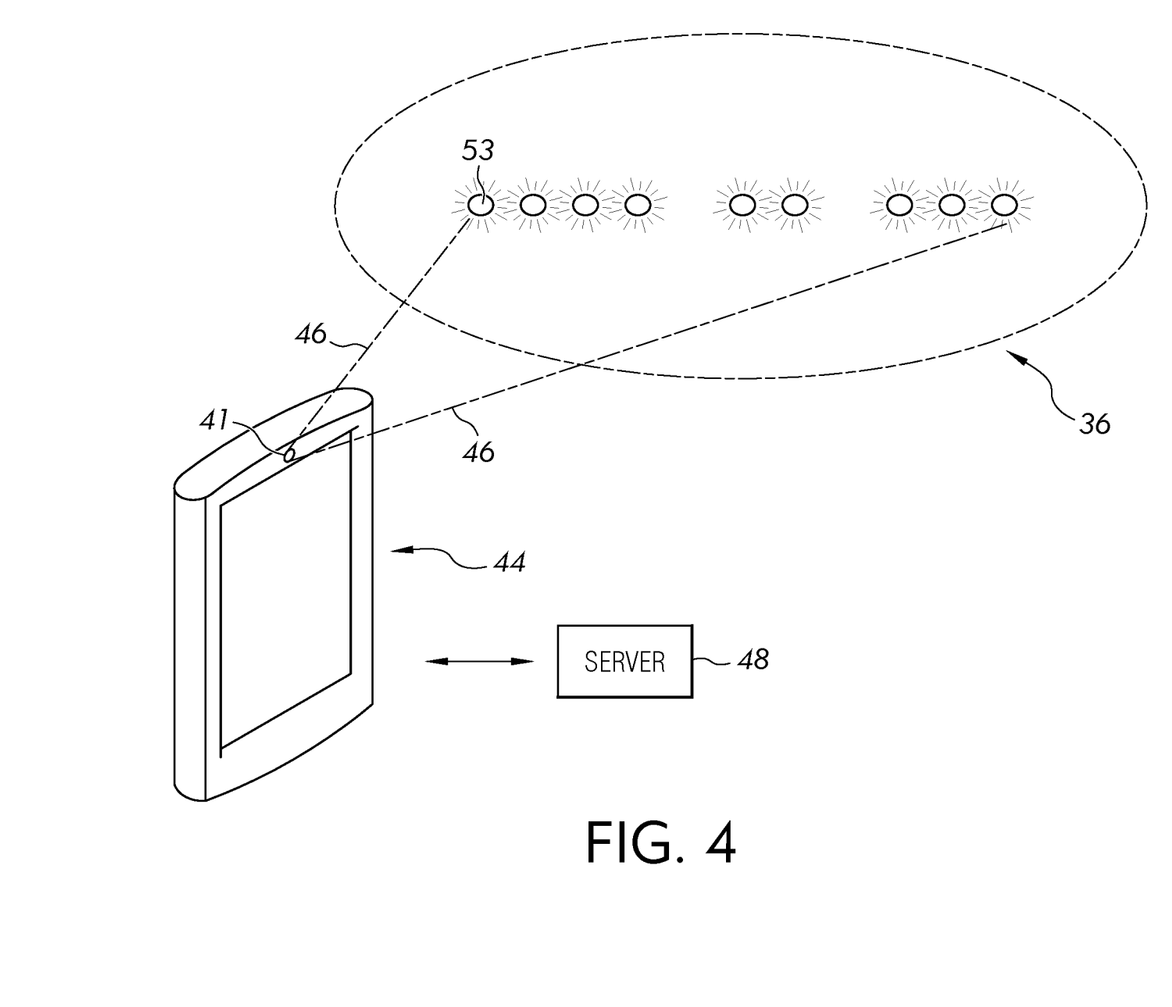
FIG. 4 shows an enlarged view of a portion of a user interface including a plurality of visible indicators used to transmit an error signal to be read by a portable external device.

A region 36 of the user interface 51, shown enlarged in FIG. 4, also includes at least one, and optionally a plurality of visible indicators 53 (e.g., light-emitting diodes "LEDs") that are operable to convey primary operational information indicative of an operational aspect or state of the refrigerator 10 to a user during normal operation of the refrigerator 10. In other words, in the absence of a malfunction involving an erroneous operation of the refrigerator 10, the visible indicator(s) 53 can be illuminated to identify the mode or state in which the refrigerator 10 is operating, a set temperature, or any other operational aspect of the refrigerator 10. The operational aspect of the refrigerator 10 indicated during normal, proper operation of the refrigerator 10 is considered the primary operational information conveyed by the LED 53. The LED 53 is controlled during normal operation between on and off states to convey human-perceptible information, which can be observed by the human eye without computer assistance and understood and interpreted, such as the selected temperature or a special mode of the appliance, such as Sabbath mode or vacation mode in the case of refrigeration appliance, for example.

According to the embodiment of the user interface 51 shown in FIG. 3, each of the plurality of visible indicators 53 is a discrete, individual LED 53 that is varied between on and off states. A label (not shown) may be applied to the user interface 51 adjacent to each LED 53 to identify the primary operational aspect or information of the refrigerator signaled through operation of the LED 53. Further, although the LED 53 described for the illustrative embodiment is a discrete LED that functions solely to indicate an operational state of a feature of the refrigerator 10, alternate embodiments can utilize one or a plurality of segments of a seven-segment display, or any visible indicator that does not spell out the nature of a malfunction in a human-readable manner to the user. It is further appreciated that any or all of the LED 53 can have a single color, or can be variable to display various colors.

Turning back to FIG. 1, the refrigerator 10 may include an electronic controller 100 that is used substantially for controlling the operations of the appliance, including for controlling the operation of the dispensing assembly 50. The controller 100 in FIG. 1 is illustrated on the side wall of the refrigerator. However, the controller 100 may be located in various locations throughout the refrigerator (e.g., on the back internal wall, in the ceiling, bottom wall, or rear external wall of the refrigerator, etc.).

The controller 100 can include one or more microprocessors, a microcontroller, a digital signal processor (DSP), an application specific integrated circuit (ASIC), a field-programmable gate array (FPGA), discrete logic circuitry, or the like. The controller 100 can further include at least one timer that keeps track of, or counts, various time intervals described herein. The controller 100 can also include memory and may store program instructions that, when executed by the controller 100, cause the controller 100 to provide the functionality ascribed to it herein. Specifically, the controller 100 can be programmed to control the operations of the user interface 51. The memory may store different predetermined temperature values corresponding to predetermined distances, time periods, or frequencies (e.g., binary data) of the visual light indicators, as described below. The memory may include one or more volatile, non-volatile, magnetic, optical, or electrical media, such as read-only memory (ROM), random access memory (RAM), electrically-erasable programmable ROM (EEPROM), flash memory, or the like. The controller 100 can further include one or more analog-to-digital (A/D) converters for processing various analog inputs to the controller 100.

The controller 100 can include input/output circuitry for interfacing with the various system components. For example, the controller 100 can receive as input signals, and interpret, the error signals communicated by the visible light indicators, signals from fresh-food and freezer compartments temperature sensors, or signals from the proximity sensor in the dispensing assembly 50. Outputs of the controller 100 can be parameters related to status of various components of the appliance and the corresponding error codes indicating the reason for malfunction of the appliance, as described in detail below. For example, the controller 100 can receive and interpret temperature signals from fresh-food and freezer compartments sensors, and processes these signals to control the operation of the refrigeration and non-refrigeration components described above based on these signals. Specifically, inputs to the controller 100 can be provided from the freezer and the fresh-food compartment temperature sensors, or from the user interface 51. Outputs from the controller 100 can control at least the energization of the compressor, the evaporator fan, and the condenser fan, as well as to energize the LED 53. The controller 100 can be connected to output alarm devices, such as light emitting elements or sound emitting elements. The controller 100 can also initiate regular defrost operations at standard intervals, which may be stored in the memory of the controller 100 to be selected according to operating conditions of the refrigeration system.

The controller 100 can function in response to input signals from components of the dispensing assembly 50, including the plurality of buttons 52, 54, 56 and the actuator 62. The controller 100 can be arranged so that, in response to input signals from these components, the controller 100 will issue output signals to selectively cause the buttons 52, 54, 56, or the LED 53 to be illuminated, and cause water to be delivered through the dispensing tube 66 (i.e., by actuating a solenoid valve (not shown)) and/or to cause cubed or crushed ice to be delivered through the chute 64.

As described above, the sensor 59 may detect when the user is within the predetermined distance from the front surface of the user interface 51. Upon receiving a signal from the sensor 59, the controller 100 may energize one of the LEDs 53 to indicate the presence of the user at a predetermined distance from the user interface 51.

The controller 100 receives from the freezer and the fresh-food compartment temperature sensors temperature information indicative of the operational temperature of the refrigerator 10. The controller 100 also receives information indicative of the desired temperature of the freezer and the fresh-food compartments inputted by the user via an appropriate input provided to the user interface 51 or to a separate user interface that can be arranged can be arranged variously within the appliance, such as beneath the top wall of the fresh food compartment 14, for example. The controller 100 is further configured to determine that a malfunction has occurred during normal operation of the appliance. In one example, the controller 100 can determine that a malfunction has occurred in response to making a determination that the temperature information transmitted by the freezer and the fresh-food compartment temperature sensors is not consistent with, or does not reflect the desired temperatures inputted by the user. In another example, voltage or current sensors can be included in the appliance to allow the controller 100 to detect anomalies such as under and over-voltage conditions, short circuits, etc. As will be appreciated by one of ordinary skill in the art, various malfunctions, and error conditions, such as a communication failure for example, can be detected by the controller 100, with or without the use of specific sensors. Moreover, such malfunctions can be specific to the particular function(s) of the appliance. In various examples, the malfunctions can include operation of the heating elements of a stove, rotation of a basket in a clothes washer or dryer, and/or operation of a water spray system for a dishwasher. It is to be appreciated that the instant application is not limited to any specific malfunction of an appliance.

In response to determining that a malfunction has occurred, the controller 100 identifies a particular error signal or error code (e.g., from a table stored in memory) corresponding to the malfunction, and controls the operation of one LED 53 or other visible indicator to display an error signal or code. For example, LED(s) that are not part of the user interface 51 or other control can be used to convey primary operational information indicative of an operational aspect or state of the appliance. Examples of such LED(s) are a green-colored LED at the bottom of a refrigerator door on an upright freezer that normally indicates that power is still on or any other visible indicators that are arranged to be easily seen or accessible by the user. The error signal or code can be embodied as the repeated activation and deactivation of the LED 53 at a predetermined frequency (e.g., binary data) that is incomprehensible to the human observer (e.g. imperceptible to the human eye) without computer assistance, but is readable by a portable code external device or reader 44 (FIG. 4) as described below. At such a frequency, the LED 53 may appear to flicker to a user observing transmission of the error code, but the user cannot interpret the error code viewing the operation of the LED 53 at such a high frequency with the naked eye. Thus, the controller 100 is configured to utilize the LED 53 or other visible indicator that serves a primary purpose other than error indication during normal operation of the refrigerator 10 to convey error information in response to a malfunction. The error signal or code is displayed only during the malfunction, with the LED 53 conveying the primary operational information when the malfunction does not exist. Such visible indicators have not traditionally been utilized for sophisticated error indication. Sophisticated error indication (something more than a few LED flashes to be counted by a user) can be readily done using an alphanumeric display. However, it can be desirable to exclude from the user interface 51 an alphanumeric display that is operable to display the error code, due to space limitations or to give the appliance a professional look and feel, for example. In such embodiments, employing LED-based error communication as discussed herein can be useful.

In certain embodiments, the frequency of the periodic activation and deactivation of the LED 53 can be high enough so as to exceed the flicker fusion threshold and appear to remain illuminated during display of the error code. The flicker fusion threshold is a threshold, typically in the range of 50 Hz to 60 Hz, beyond which an average person cannot perceive the deactivation of a light source during periodic activation and deactivation of the light source. If the frequency of activation/deactivation of the LED 53 exceeds the flicker fusion threshold, the primary operational information and the error code can be displayed simultaneously, since the LED 53 will appear to remain illuminated. However, the existence of the error condition may not be appreciated by the user viewing the primary operational information (since any flickering of the LED to communicate the error code would be too fast to be observed). In this case, other LEDs, audible annunciators, etc., can be activated to indicate to the user that an alarm has occurred. In certain embodiments, the refrigerator 10 can include a dedicated error LED that does not display primary operational information to a user and that indicates the occurrence of an error condition by flashing at a frequency either below or above the flicker fusion threshold while displaying the error code. The error condition can also be indicated by activation/deactivation of the LED using a short pulse width, so that the LED appears to be off or dim while display the error code. It is further contemplated that in addition or as an alternative to flashing the LED, the light color emitted by the LED could be changed or varied to indicate the particular malfunction code.

The embodiments discussed above utilize a single, discrete LED 53 to transmit the error signal. However, according to alternate embodiments the controller 100 can control operation of a plurality of LEDs 53 or other closely-arranged visible indicators to transmit an error signal or code. The visible indicators utilized according to such embodiments are arranged close enough together on the refrigerator to be captured within the same frame (represented by broken lines 46 in FIG. 4) in a viewfinder of a camera 41 or other image capture device provided to an external device, such as the portable code reader 44, for example.

Each of the plurality of visible indicators 53 can be operated by the controller 100 to convey different primary operational information to the user during the normal operation of the refrigerator. However, one or more of the LEDs 53 can also be controlled by the controller 42 to display a different respective portion or subset of the error signal or code to be received by the portable code reader 44. Two or more of the LEDs 53 can also be controlled by the controller 42 to redundantly display the error signal or code, to help ensure that the error code is correctly captured and interpreted by the portable code reader 44. Data integrity verifications can be included as part of the error signal or code displayed by the appliance. For example, checksums or cyclic redundancy checks (CRC) can be included in the error signal. If multiple LEDs 53 are used to display the error signal or code, such LEDs can be spaced apart from each other in a manner suitable for establishing a proper positional relationship between portable code reader 44 and the user interface 51, to help ensure that the error code is correctly captured and interpreted by the reader 44.

During a malfunction, the error signal or code transmitted through use of the LED 53 or other visible indicator can be captured utilizing the camera 41 provided to the portable code reader 44 which, in the present example, is a cellular telephone commonly referred to as a smartphone. Examples of such a phone include, but are not limited to, the iPhone® from Apple, Inc., and the Galaxy S® from Samsung Electronics, Co., Android, Blackberry, etc., but other phones and other portable devices (e.g., tablet computer, laptop computer, etc.) equipped with a camera can also be used. The camera 41 can be a video camera, operable to capture motion picture video or at least a series of still photographic images at a frame rate high enough (e.g., preferably at least twice the frequency at which the LED 53 is switched on and off by the controller 100) to accurately capture the error signal. The camera 41 can be configured to image the flashing LED 53 performing visible light communication at predetermined periods to generate a plurality of images. The portable code reader 44 can be programmed with an application (App) stored in the memory of the portable code reader 44. When executed, the App reads the error code represented by the flashing LED 53, and optionally converts the code into diagnostic signal. The error code can be displayed to the user in alphanumeric form on the display of the reader 44, along with a description of the error and possibly other information, such as a recommended service provider or instructions on correcting the malfunction. The portable code reader 44 can subsequently transmit the diagnostic signal over a cellular and/or public switched communication network, or other network such as the Internet, through wireless links using wireless communication protocols, such as Bluetooth®, Wi-Fi® (based on the IEEE 802.11 family of standards of the Institute of Electrical and Electronics Engineers), Zigbee, ultra-wide band (UWB), non-RF protocols, such as infrared or visible light, for example, as well as other radio frequency (RF) communication protocols, for example. If transmitted, the diagnostic signal can be provided to a remote server 48 along with location information (e.g., GPS data) corresponding to the current location of the appliance and reader 44. The remote server 48 can respond with diagnostic information, i.e., diagnosis result information regarding an operation state and a problem state or malfunction of the refrigerator 10, and information regarding a service provider capable of servicing the appliance, and transmit this information to the reader 44. Either the reader 44 or the server 48 can be programmed to automatically determine, based on the location information, a service provider located near the appliance, in a geographical region corresponding to the current location of the domestic appliance and the reader. The diagnostic signal can optionally indicate a specific part of the appliance that has malfunctioned and must be replaced or repaired, the existence of a condition that caused the malfunction, or any other data that is useful in identifying the cause of the malfunction, and optionally resolving the malfunction. In certain embodiments, the reader 44 can be configured to display, based on the information about the appliance obtained by the reader 44, information about the appliance, such as accessories available for the appliance, user manuals, installation instructions, recipes, and the like.

Examples of data that can be displayed by the LED 53, captured by the portable code reader 44, and optionally transmitted to the remote server 48 includes: current error code, date and/or time stamp of current error, previous error codes, date and/or time stamp of previous errors, appliance model number, appliance serial number, part numbers of various components that may need to be serviced or replaced, operational modes when errors occurred, operational temperature when errors occurred, user setpoints when errors occurred, firmware IDs, nonvolatile data identifiers, run time since install, power quality information, control input data, control output states, a website address for obtaining information about the appliance, user habits (e.g., compartment temperatures, special refrigeration modes, common cooking cycles, food probe temperatures, heating element and fan status, etc.), software versions, and the like.

The visible indicators 53 transmit signals with diagnostics data to the camera 41 of the smartphone 44. The smartphone 44 interprets the signals transmitted and received from the visible indicators 53 and communicates the data to the user.

The visible indicators 53 transmit signals with diagnostics data to the camera 41 of the smartphone 44 via Visible light communication (VLC), also known as optical wireless communication (OWC) or Light-Fidelity (Li-Fi). Li-Fi transmits data at high speeds via modulated visible light, ultraviolet, or infrared radiation. Recent advances in light-emitting diode (LED) technology make visible light communication (Li-Fi) for wireless Internet connectivity practical by using LED-based illuminating fixtures as access points. LEDs can not only be used for illumination and as indicators, but they can also be transmitters for visible light communication since they can be modulated at a relatively high speed when compared with traditional light sources.

Image sensors or smartphone cameras are widely used in our daily lives. Nearly all mobile phones available in the market nowadays have embedded Complementary Metal-Oxide-Semiconductor (CMOS) cameras allowing users to take photos and videos. These already existing mobilephone image sensors can be used as VLC receivers.

In another embodiment, the optical wireless communication link 46 in FIG. 4 is configured for bi-directional (two-way) communications between the visible indicators 53 and the portable code reader 44, which allows both transmission of data from the refrigerator 10 to the external device 44, and transmission of data from the external device 44 to the refrigerator 10. The data transmitted from the refrigerator 10 to the external device 44 includes diagnostics data about the operation of the refrigerator, as described above. Visual data transmitted by the visible indicators 53 is then read by an App or camera that is connected, via Li-Fi optical protocol, to an external device 44 (e.g., smartphone, computer, server, etc.).

The data transmitted from the external device 44 to the refrigerator 10 can include commands related to the operation of the appliance. Initially, a button and/or switch activation sequence on the appliance can be used to start the communication. The button and/or switch activation sequence can be indicated on the App downloaded to the smartphone 44. For example, as shown in FIG. 2, a door switch housing 20*a*, 20*b* is fixedly mounted into the top horizontal mullion of the fresh food compartment 14, above the compartment. The location of the door switch illustrated in FIG. 2 is just one example, and the door switch may be located into the top liner of the fresh food compartment or in the bottom of the front wall of the fresh food compartment liner (i.e., into the bottom horizontal mullion), below the compartment. Commonly multiple switches 20*a*, 20*b* may be provided (i.e., one per door) and are positioned corresponding to a closed-position of each respective door. A typical door switch can be a spring-loaded plunger contact switch that is actuated when the closed refrigerator door presses against it, or alternatively can be a non-contact magnetic reed switch. The door switch housing 20*a*, 20*b* illustrated in FIG. 2 carries a reed switch fixedly recessed on the rear side of the reed switch housing. The fresh food compartment door 24 has a magnet 21*a*, 21*b* that is foamed into the door liner. When the door 24 is closed, the magnet 21*a*, 21*b* in the door liner is placed adjacent to the reed switch sensor 20*a*, 20*b* mounted in the cabinet liner. During operation, opening and closing of the fresh food compartment door 24 will move the magnet carriers towards or away from the reed switch housing 20. At door closing, the magnet carriers are moved to within the operational range of the reed switch housing such that the reed switches therein will sense a change of state and indicate a door-closed condition to the refrigerator main controller. Conversely, at door opening, the magnet carriers are moved away from the operational range of the reed switch housing to indicate a door-open condition. Opening and closing the fresh food compartment door 24 a few times in a row (e.g., 3 times in 5 seconds) or opening/closing multiple refrigeration doors in some order or some number combination that is unlikely to occur by regular user operation (to avoid false activations) can be used to activate/deactivate special refrigeration modes, such as Sabbath mode or diagnostics/service modes, for example. These actuation sequences are typically programmed into the memory of the refrigeration main controller 100. An additional door switch actuation sequence, similar to the Sabbath mode or diagnostics/service modes actuation sequences, can be programmed into the memory of the refrigeration main controller 100 and used to start the communication between the external device 44 and the visible indicators 53 of the refrigerator 10 (e.g., to pair the external device 44 and the visible indicators 53). A beep sound and/or a visual indicator may confirm that the communication has started. Optionally, the diagnostics or service mode will be automatically exited after a predetermined amount of time of inactivity (e.g., 10 minutes or other value) or when the refrigerator is turned off.

Alternatively, a button sequence on the App downloaded to the smartphone 44 can be configured to start the two-way communication.

In certain embodiments, some, or all, of the visible indicators 53 can be configured as inputs for receiving signals from the external device 44, and the smartphone's camera flash or display screen can be used to transmit visual data for two-way communication for controlling the appliance, reprogramming, or recalibration. For example, some, or all, of the visible indicators 53 can be LED transceivers which include a combination of a transmitting circuit and a receiving circuit configured to transmit and receive signals to and from external devices, together with the light emitting circuitry for providing a visual indicator to the user. Using the App, the user can then turn ON and OFF the visible indicators 53 on the user interface 51, as well as perform other remote functions related to the refrigerator 10, such as turn ON and OFF the internal lighting in the refrigeration compartments, or any other LEDs, or activate special modes, such as Sabbath mode or vacation mode, for example. In yet other examples, the two-way communication could be used to install identifying information about the appliance and/or update firmware or other computer code into the controller 100 of the appliance. Signals from the App to the visible indicators 53 or other sensor 59 can also be used to determine, transmit, and update the software version of any programs or logics used in the appliance.

In yet other examples, the two-way communication could be used to calibrate the appliance. For example, in the case of a refrigerator, a service technician can check whether the readout temperature of the refrigerator thermometer corresponds to the actual temperature inside a refrigerator compartment, and calibrate the thermometer. The technician can also calibrate the thermostat to prevent the refrigerator or the freezer from running all the time. In the case of a cooking appliance, a service technician can check whether the temperature of the oven temperature display corresponds to the actual temperature inside the oven, and calibrate the thermostat if needed. Similar calibration may be performed for components of microwave ovens, dishwashers, clothes washing machines and/or dryers, as well as any other appliance which can be used in a typical home or commercial setting.

As an example of a possible implementation, a service technician might be evaluating some issue with an appliance. The technician downloads an app on a smartphone that directs the technician to press a sequence of buttons on the appliance (e.g., buttons 52, 54, and/or 56), and then is directed to place the camera of the smartphone on a specific part of the appliance. The LEDs 53 on the appliance then flash a sequence of characters or blinks that are viewed by the smartphone camera 41 and then the app can interpret to determine the status of all of the appliance's components, any errors present in the system, software version, etc. Further, the graphical display on the smartphone (i.e., portable code reader 44) can display the relevant diagnostic or repair information to the user in high detail.

Figure 5:
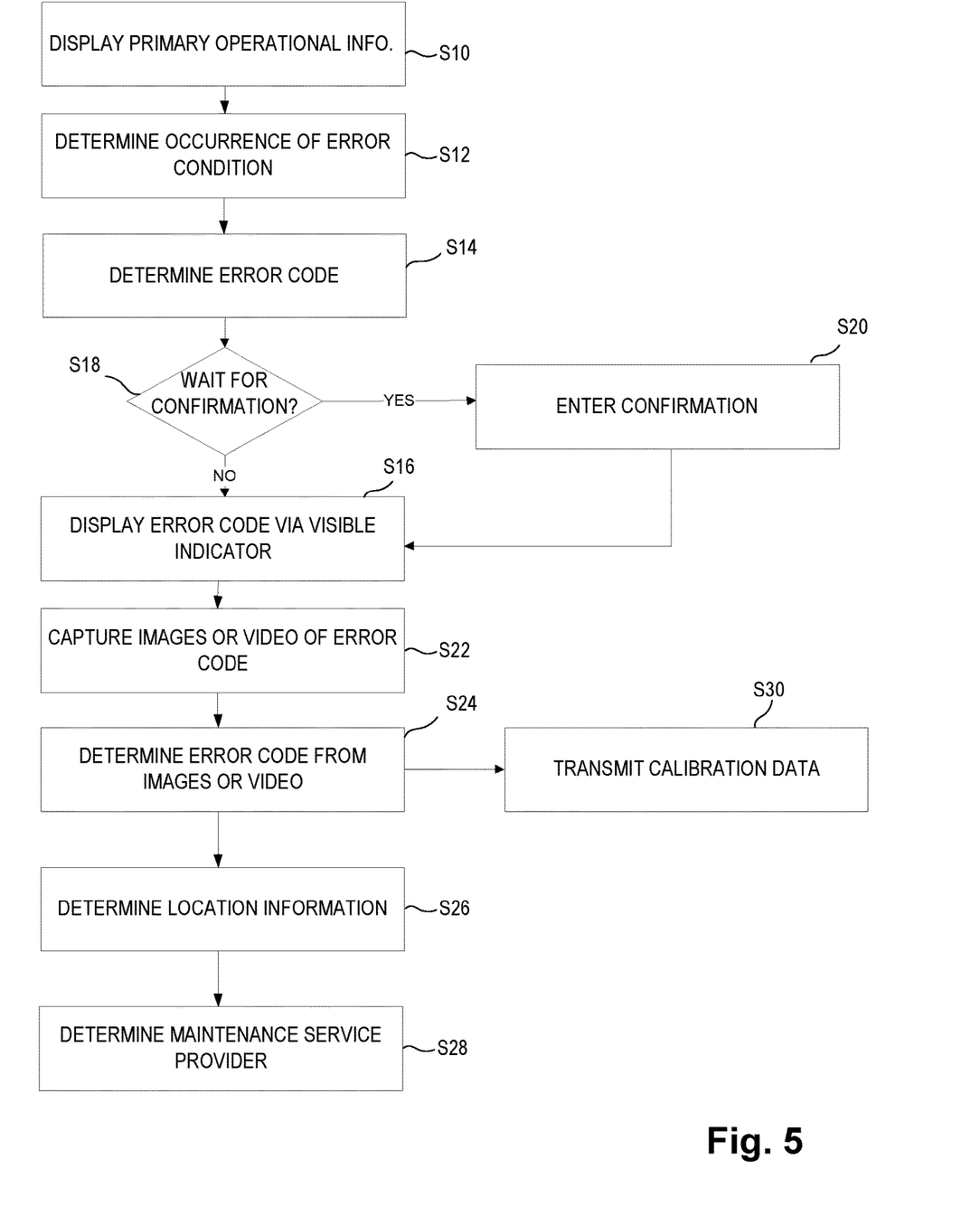
FIG. 5 is flow diagram for an example method of communicating diagnostic information from an appliance.

FIG. 5 is a flow diagram for an example method of communicating diagnostic information from a household appliance. Primary operational information indicative of an operational state of the household appliance is displayed using a visible indicator as described above (step S10). The occurrence of an error condition is determined by the appliance controller 100 during operation of the household appliance (step S12). When the error condition is detected by the controller, or the controller is otherwise informed of the error condition, the controller determines a corresponding error code (step S14). The controller then controls the operation of one or more visible indicators to display the error code by periodically activating and deactivating the visible indicator (step S16). It is contemplated that the error code can be displayed automatically, or may wait for confirmation, which may require the user to press a pre-determined sequence of buttons on the appliance (e.g., buttons 52, 54, and/or 56) or a door switch actuation sequence on the household appliance before starting the two-way communication to initiate the display (step S18). Alternatively, the error code may wait for confirmation, which may require the user to press a pre-determined button sequence to be inputted into an application downloaded to the external device 44 before starting the two-way communication to initiate the display (step S18). After the confirmation is entered (step S20), the controller displays the error code by periodically activating and deactivating the visible indicator (step S16). The visible indicator can be activated and deactivated at a frequency above or below the flicker fusion threshold as discussed above. The portable code reader captures images or video of the displayed error code via its camera (step S22), and the portable code reader determines the error code from the captured images or video (step S24).

Optionally, the portable code reader can determine location information corresponding to the current location of the appliance and reader (step S26). The location information can be determined based upon information coded into the appliance, or alternatively using hardware or software in the portable code reader, such as an integrated GPS receiver in a smartphone. The error code and location information can be transmitted from the portable code reader to a remote server as discussed above. Either the portable code reader or the remote server can make determinations based on the error code and/or the location information, such as determining a maintenance service provider located in a geographical region corresponding to the current location of the domestic appliance and the camera device (step S28), determining replacement parts for the appliance, determining steps to correct the error condition, etc. Such information can be transmitted to and/or displayed on the portable code reader.

Additionally, as noted above, the diagnostic system can be configured for two-way communication. Thus, the above-described flow diagram can be augmented to further include a step of transmitting information from the portable code reader to the appliance. In non-limiting examples, after the portable code reader determines the error code from the captured images or video (step S24), a command can be transmitted from the portable code reader back to the appliance. The technician can then use the app installed on the portable reader to transmit service commands, such as calibration commands, for example (step S30), to the appliance to calibrate thermostats, temperature displays, etc., as described above. In another example, a service technician could upload malfunction history and/or service repair history into the appliance, which could include a special indication that the repair had been performed by a manufacturer authorized service technician.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A household appliance, comprising:
 a user interface including a plurality of visible light-emitting indicators configured to convey primary operational information indicative of an operational aspect of the household appliance to a user during a normal operation of the household appliance;
 a processor configured to:
  obtain an error condition during an operation of the household appliance;
  determine an error code corresponding to the error condition;
  wait to detect a door switch actuation sequence on the household appliance to start a two-way communication;
  in response to detecting the door switch actuation sequence, cause the plurality of visible light-emitting indicators to transmit the error code to an external device that interprets the error code and communicates user diagnostics data corresponding to the error code to the user based on the two-way communication, wherein the plurality of visible light-emitting indicators are configured for the two-way communication between the household appliance and the external device by the plurality of visible light-emitting indicators receiving control signals from the external device.

2. The household appliance of claim 1, wherein the control signals are used for controlling the household appliance, reprogramming, or recalibration.

3. The household appliance of claim 1, wherein the processor is further configured to obtain an error signal indicative of diagnostic data of the household appliance and the external device interprets the error signal and communicates the diagnostics data to the user.

4. The household appliance of claim 1, wherein the plurality of visible light-emitting indicator are configured for a Visible light communication (VLC) or an optical wireless communication (OWC).

5. The household appliance of claim 1, wherein the external device is a portable device having a camera configured to interpret the communication signal.

6. The household appliance of claim 5, wherein the external device communicates the diagnostics data to the user via an application installed on the portable device.

7. The household appliance of claim 6, wherein a button sequence on the application is configured to start the two-way communication.

8. The household appliance of claim 1, wherein one of a knob or a button actuation sequence on the household appliance is configured to start the two-way communication.

9. The household appliance of claim 1, wherein the household appliance is one of a refrigerator, a freezer, a cooking appliance, a microwave oven, an air fryer, a coffee maker, a dishwasher, a washing machine, a laundry center, or a dryer.

10. The household appliance of claim 1, wherein the communication signal comprises repeated illuminations and deactivations of the plurality of visible light-emitting indicators at a predetermined frequency or illumination sequence.

11. The household appliance of claim 1, wherein the visible light-emitting indicators include discrete light emitting diodes.

12. The household appliance of claim 1, wherein the user interface comprises a plurality of visible light-emitting indicators configured to convey different primary operational information during the normal operation of the household appliance, and at least one visible light-emitting indicator of the plurality of visible light-emitting indicators is controllable by the processor to display respective different subsets of the communication signal.

13. A method for diagnosing a household appliance comprising a user interface including a plurality of visible light-emitting indicators and a processor, the method comprising the steps of:

conveying, by the plurality of visible light-emitting indicators, primary operational information indicative of an operational aspect of the household appliance to a user during a normal operation of the household appliance;

obtaining, by the processor, an error condition during an operation of the household appliance;

determining, by the processor, an error code corresponding to the error condition;

waiting to detect a door switch actuation sequence on the household appliance to start a two-way communication;

causing, by the processor, the plurality of visible light-emitting indicators to transmit the error code to an external device based on the two-way communication;

interpreting the error code, by the external device; and communicating between the household appliance and the external device regarding the user diagnostics data corresponding to the error code, wherein the plurality of visible light-emitting indicators are configured for the two-way communication between the household appliance and the external device by the plurality of visible light-emitting indicators receiving control signals from the external device.

14. The method of claim 13, further comprising transmitting the control signals from the external device to the household appliance for controlling the household appliance, reprogramming, or recalibration.

15. The method of claim 13, wherein the plurality of visible light-emitting indicator are configured for a Visible light communication (VLC) or an optical wireless communication (OWC).

16. The method of claim 13, further comprising a step of waiting to detect one of a pre-determined button sequence to be inputted into one or more buttons of the appliance before starting said two-way communication.

17. The method of claim 13, further comprising a step of waiting to detect a pre-determined button sequence to be inputted into an application downloaded to the external device before starting said two-way communication.

* * * * *